(12) United States Patent
Sheker et al.

(10) Patent No.: US 10,443,694 B2
(45) Date of Patent: Oct. 15, 2019

(54) APPARATUS FOR CONVERTING ROTATION MOTION TO LINEAR RECIPROCATING MOTION

(71) Applicant: Envirodyne Systems Inc., Camp Hill, PA (US)

(72) Inventors: Robert E. Sheker, Camp Hill, PA (US); Roy Shanafelter, Lewisberry, PA (US); Eric Alan Bushey, York Haven, PA (US)

(73) Assignee: Envirodyne Systems Inc., Camp Hill, PA (US)

( * ) Notice: Subject to any disclaimer, the term of this patent is extended or adjusted under 35 U.S.C. 154(b) by 0 days.

(21) Appl. No.: 15/886,350

(22) Filed: Feb. 1, 2018

(65) Prior Publication Data

US 2019/0234497 A1    Aug. 1, 2019

(51) Int. Cl.
| | |
|---|---|
| *F16H 25/08* | (2006.01) |
| *F16H 25/16* | (2006.01) |
| *F16H 25/14* | (2006.01) |
| *F16H 53/02* | (2006.01) |

(52) U.S. Cl.
CPC ............. *F16H 25/14* (2013.01); *F16H 53/02* (2013.01)

(58) Field of Classification Search
CPC ................................ F16H 25/14; F16H 53/02
USPC ............................................................ 74/55
See application file for complete search history.

(56) References Cited

U.S. PATENT DOCUMENTS

| | | | | |
|---|---|---|---|---|
| 21,061 A * | 8/1858 | Brooks | ................... | F16H 25/14 74/55 |
| 1,051,917 A * | 2/1913 | Root | ..................... | F02B 75/048 123/78 F |
| 1,054,350 A * | 2/1913 | Jacobson | ................. | F16H 25/14 74/55 |
| 1,385,002 A * | 7/1921 | Hall | ........................ | F16H 53/08 74/55 |
| 1,724,772 A * | 8/1929 | Palmer | .................... | F16H 25/14 74/55 |
| 1,748,443 A * | 2/1930 | Dawson | ................... | F16H 25/14 123/54.3 |
| 1,798,104 A * | 3/1931 | Palmer | .................... | F16H 25/14 123/54.3 |
| 1,980,527 A * | 11/1934 | Hewton | ................. | D03D 49/60 139/190 |
| 2,528,386 A * | 10/1950 | Napper | ................... | F02B 75/32 74/55 |
| 5,297,448 A * | 3/1994 | Galvin | .................... | F01B 1/062 123/197.4 |
| 5,894,763 A | 4/1999 | Peters | | |
| 7,029,166 B2 | 4/2006 | Haughton et al. | | |
| 7,278,781 B2 | 10/2007 | Haughton et al. | | |
| 7,364,351 B2 | 4/2008 | Haughton et al. | | |

(Continued)

*Primary Examiner* — Jake Cook
(74) *Attorney, Agent, or Firm* — Wendy W. Koba

(57) ABSTRACT

A pair of spaced-apart cam disks disposed along a common power shaft, with a pair of cam followers disposed within channels formed in opposing inner surfaces of the cam disks, forms a balanced arrangement for creating linear reciprocating motion from the rotation of the pair of cam disks. A linear motion shaft is coupled to the cam followers. As the cam disks synchronously rotate and the cam followers trace the path formed by the paired channels, this rotational motion is converted into linear, reciprocal motion that provides the translational movement of the linear motion shaft.

9 Claims, 6 Drawing Sheets

(56) References Cited

U.S. PATENT DOCUMENTS

| | | |
|---|---|---|
| 7,399,112 B2 | 7/2008 | Haughton et al. |
| 7,685,896 B2 | 3/2010 | Haughton et al. |
| 9,027,423 B1* | 5/2015 | Cui .................. F16H 25/20 74/53 |
| 9,162,195 B2 | 10/2015 | Haughton et al. |
| 2010/0242919 A1* | 9/2010 | Oprea .............. F01L 1/181 123/48 D |
| 2017/0253512 A1 | 9/2017 | Goldhardt et al. |

* cited by examiner

APPARATUS FOR CONVERTING ROTATION MOTION TO LINEAR RECIPROCATING MOTION

TECHNICAL FIELD

The present invention relates to apparatus for generating linear, reciprocating motion and, more particularly, to an apparatus utilizing a cam follower arrangement to convert rotational motion to linear, reciprocating motion without requiring the use of sliding parts.

BACKGROUND OF THE INVENTION

Many of the industrial mixing systems in use today are based on linear motion technology, providing a linear, vertical motion of a mixing shaft within a reactor. As designed, current systems depend on sliding, elements in the motion conversion system. These sliding elements are known to produce friction and results in wear of the strategic components of the system. Additionally, conventional linear motion systems are imbalanced, where much of the energy expended in retracting the linear motion shaft results from the lifting the yoke assembly.

One particular use for linear motion mixing is associated with the treatment of waste products in anaerobic digester tanks. The intent of anaerobic digestion is the destruction of volatile solids by microorganisms in the absence of oxygen. Digestion rates are primarily a function of several factors including, but not limited to, solid retention time, hydraulic retention time, temperature (ambient of about 95° F. preferred), pH, and mixing. In particular, optimal mixing produces uniformity by reducing thermal stratification, dispersing the substrate for better contact between, reactants, and reducing scum buildup in the digester. If the mixing is inadequate, the efficiency of the anaerobic digestion can be significantly reduced.

SUMMARY OF THE INVENTION

The needs remaining in the prior art are addressed by the present invention, which relates to apparatus for generating linear, reciprocating motion and, more particularly, to an apparatus utilizing a cam follower arrangement to convert rotational motion to linear, reciprocating motion without requiring the use of sliding parts. The inventive apparatus is particularly useful in a linear motion mixer, providing the desired mixing efficiency without the concerns associated with mixing systems utilizing sliding mechanisms to create the linear motion.

Apparatus for converting rotational motion to linear, reciprocating has been developed in accordance with the present invention, to convert circular motion into reciprocal linear movement of shaft exclusively through the use of rotating elements, eliminating the need for any sliding contact of moving components as necessary in the prior art. The rotating elements are all supported by anti-friction bearings to minimize inefficiencies in input power usage.

In an exemplary embodiment, the present invention takes the form of an apparatus for converting rotation motion to linear, reciprocal motion, where the apparatus comprises a pair of spaced-apart cam disks, each disk including an inscribed channel formed within an interior surface of each disk. The pair of spaced-apart cam disks is oriented such that the inscribed channels face each other in a matched orientation. The apparatus further comprises a drive shaft disposed through the centers of the pair of spaced-apart cam disks (imparting rotational movement to the pair of spaced-apart cam disks), and a pair of cam followers, each, cam follower disposed within a separate one of the inscribed channels. The pair of cam followers trace the path of the inscribed channels as the pair of spaced-apart cam disks are rotated. A cam hub is positioned between and connected to the pair of cam followers, with a linear motion shaft attached to the cam hub, where the motion of the pair of cam followers imparts linear, reciprocal motion to the linear motion shaft along a longitudinal axis of the linear motion shaft.

One or more embodiments of the present invention incorporate an anti-rotation bracket for confining the movement of the linear shaft and preventing any "rocking" of the shaft as the cam disks rotate.

It is an aspect of the present invention that the use of a pair of cam disks synchronously rotated by a common power shaft imparts, a balanced force onto the linear motion shaft. As such, this balanced configuration reduces the amount of power required of a single cam follower to lift the linear motion shaft during the upstroke of the configuration.

It is to be understood that the particular topology of the inscribed channels may be designed for a particular purpose, as along as both are matched. Different closed-loop paths provide differences in frequency, amplitude and acceleration of the movement of the linear motion shaft.

The conversion apparatus may be oriented in any direction (typically, vertical or horizontal), providing linear motion along the longitudinal axis of the output shaft. Moreover, while the conversion apparatus will be discussed below in the context of a linear motion mixer, it is to be understood that the conversion apparatus may be used in various other systems.

Other and further embodiments and advantages of the present invention will become apparent during the course of the following discussion and by reference to the accompanying drawings.

BRIEF DESCRIPTION OF THE DRAWINGS

Referring now to the drawings, where like numerals represent like parts in, several views.

DETAILED DESCRIPTION

Figure 1:
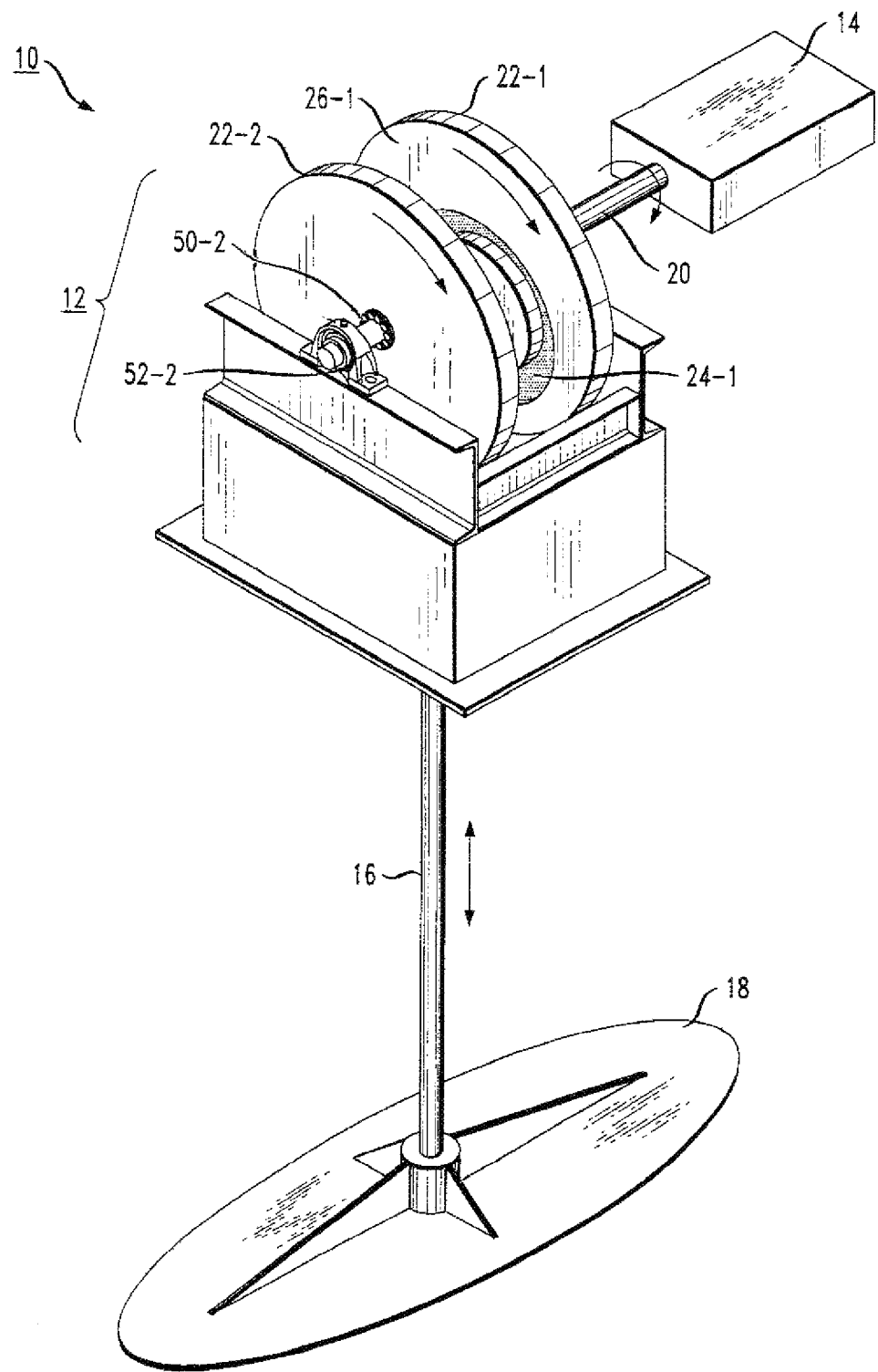
FIG. 1 is a simplified diagram of an exemplary linear motion mixer formed in accordance with the present invention.

FIG. 1 is a simplified view of an exemplary linear motion mixer 10 including a motion conversion apparatus formed in accordance with the present invention. As will be described in greater detail below, mixer 10 includes a conversion unit 12 for converting circular motion into a linear, reciprocating motion. A power unit 14 is attached to conversion unit 12 and is used to impart circular, rotational motion to, conversion unit 12. A linear motion shaft 16 is also attached to conversion unit 12 and, in response to, the rotational movement of conversion unit 12, moves upward and downward in a reciprocating manner, as shown by the double-ended arrow in FIG. 1. A mixing paddle 18 (of any desired configuration) is attached to a distal end of shaft 16 and is used to impart mixing to the material (not shown) in a known manner. In the embodiment illustrated in FIG. 1, mixing paddle 18 is shown to exhibit an elliptical form. Many other paddle configurations are possible including, but not limited to, circular disk designs (with perhaps a scalloped or otherwise modified outer edge), toroidal designs, or any combination of paddle/plunger designs as best appropriate for a specific application.

Continuing with the description of mixer 10, a power shaft 20 is included at the output of power unit 14 and is connected to a pair of spaced-apart cam disks 22-1 and 22-2 of conversion unit 12. Each cam disk 22 is formed to include an inscribed channel 24 formed within its inner surface 26. The orientation of the illustration in FIG. 1 shows a portion of inscribed channel 24-1 and inner surface 26-1 of cam disk 22-1. It is to be understood that cam disk 22-2 has similar features.

In order to provide the reciprocal linear shaft motion in accordance with the present invention, a pair of cam followers engage with the inscribed channels and trace their path as the cam disks rotate. The cam followers are attached to the shaft and, therefore, convert the rotational motion of the cam disks to linear, reciprocal motion of the shaft (i.e., motion along the longitudinal axis of the shaft).

Figure 2:
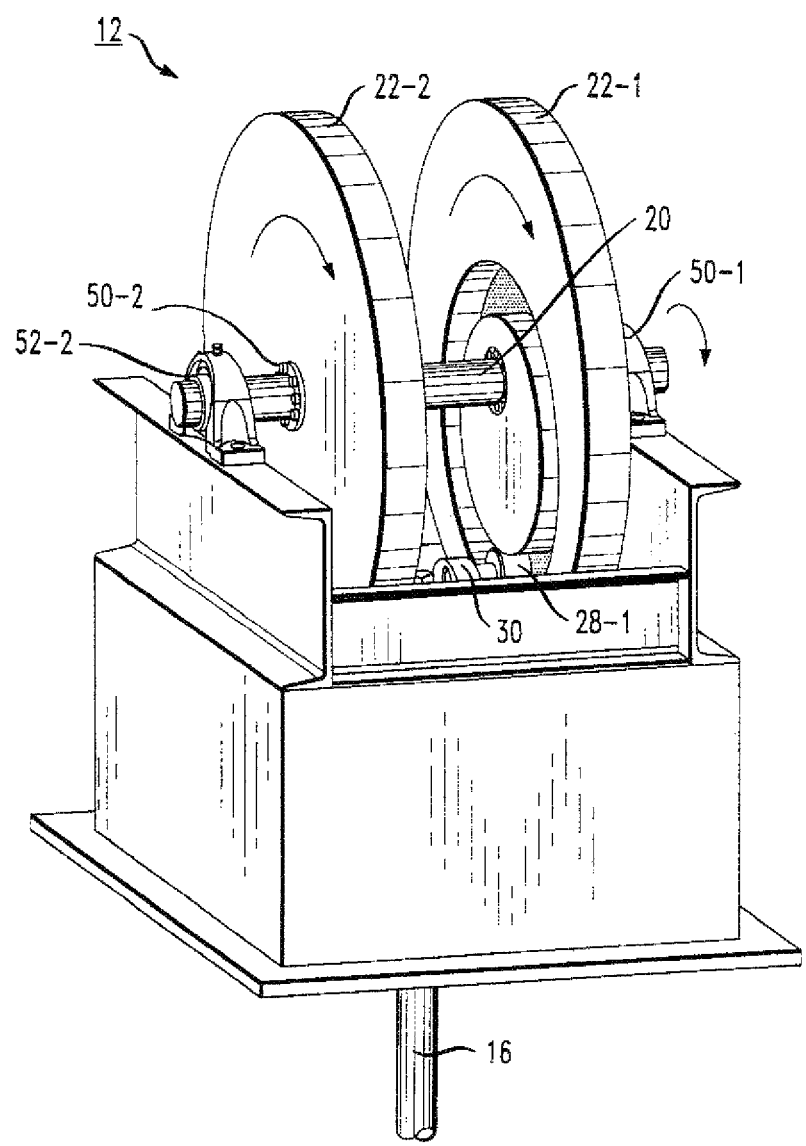
FIG. 2 is an isometric view of the upper portion of the mixer of FIG. 1.
Figure 3:
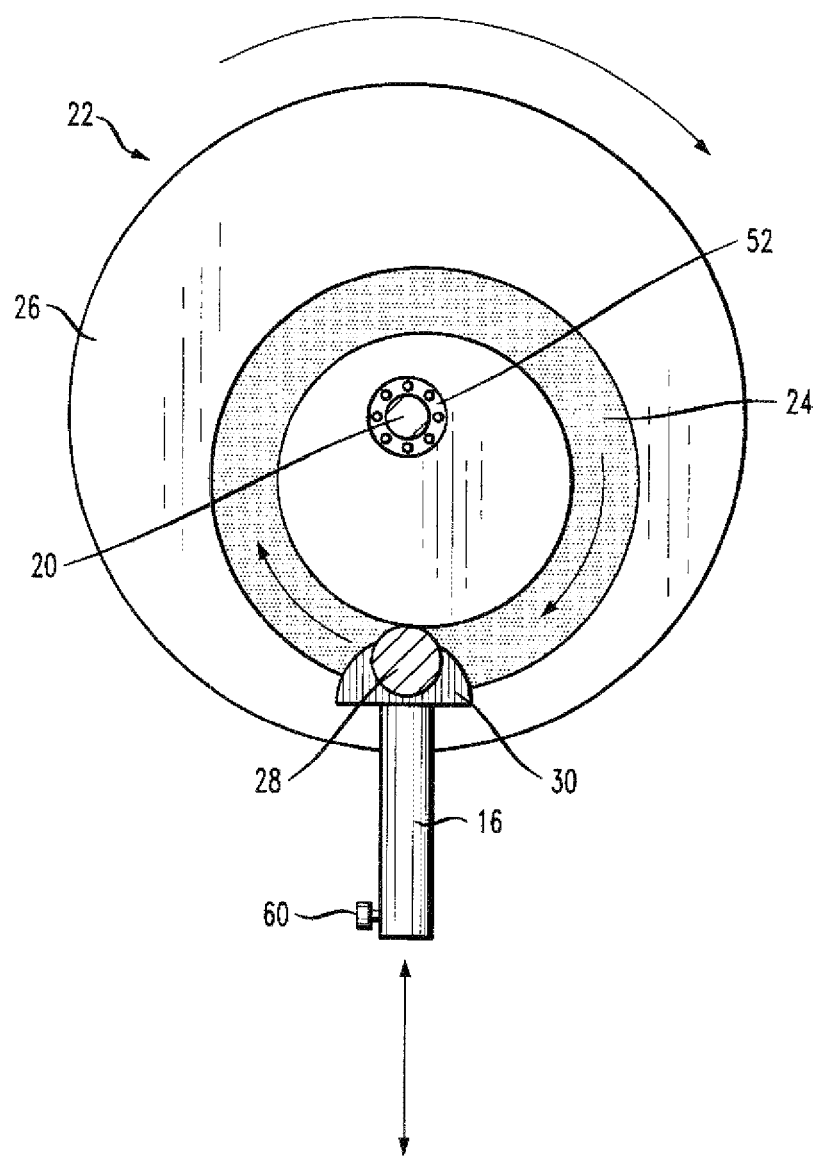
FIG. 3 is a simplified diagram illustrating the interaction between the cam disk, cam follower and linear motion shaft in the conversion of drive shaft rotational motion to vertical, reciprocating motion required for the movement of the linear motion shaft.
Figure 4:
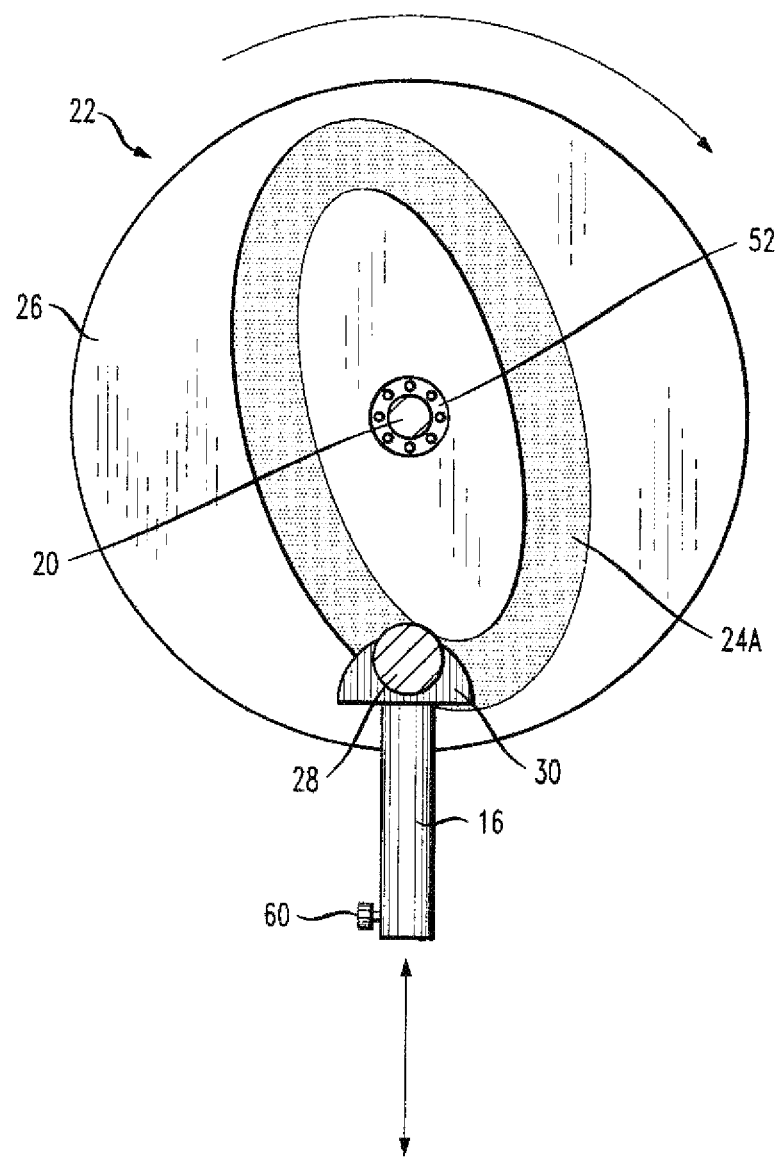
FIG. 4 is a simplified diagram, similar to FIG. 3, illustrating an alternative closed-loop topology for the inscribed channel engaging the cam follower.

FIG. 2 is an isometric view of conversion unit 12, which shows a cam follower 28-1 disposed within inscribed channel 24-1 of cam disk 22-1. FIG. 3 is a simplified diagram illustrating the conversion of rotational motion to linear motion as provided by these components of the present invention. In particular, FIG. 3 is a side view of an exemplary cam disk 22 (viewing the inside surface 26), showing inscribed channel 24 as formed within surface 26. Inscribed channel 24 may be any type of closed-loop channel form: circular, oval, or the like. FIG. 4 shows another topology of an inscribed channel 24A. The different forms and configurations of inscribed channel 24 allows for selection of frequency, amplitude, and/or accelerations of the linear motion of shaft 16 with respect to the rotation of power shaft 20.

Referring to both FIGS. 3 and 4, cam follower 28 is shown as disposed within inscribed channel 24, where cam follower 28 is free to move within channel 24 as disk 22 rotates, in a manner well-known in the art. Linear motion shaft 16 is shown as attached to cam follower 28 via a cam hub attachment 30, described in detail below. As cam disk 22 rotates, inscribed channel 24 naturally rotates as well, with cam follower 28 tracing the path of channel 24. In turn, this movement of cam follower 28 creates the desired linear movement of shaft 16. It is to be understood the actual configuration of the motion conversion apparatus of the present invention utilizes a pair of cam disks moved together by the power shaft, as shown in FIGS. 1 and 2.

Indeed, at least one advantage of linear motion mixer 10 over the prior art is this balanced design associated with the use of a pair of cam disks (and associated cam followers). As such, the energy required to move the linear motion shaft is shared between the pair of elements, significantly reducing the energy required to lift shaft 16 upward (for vertical motion; horizontal motion would move left-right) when compared to prior art configurations.

Figure 5:
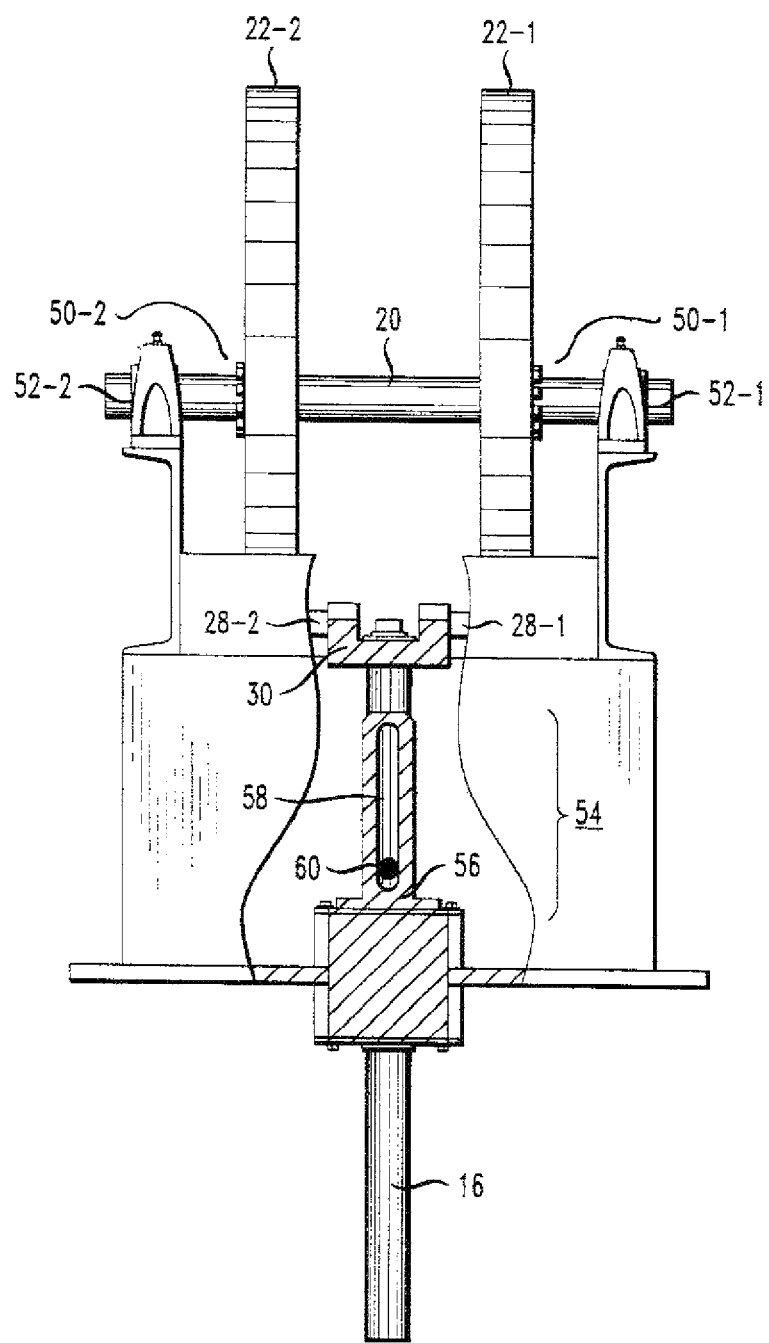
FIG. 5 is another view of an exemplary embodiment of the linear motion mixer of the present invention, illustrating in particular a connection between the cam followers and the linear motion shaft.

As mentioned above, one feature of the configuration of the present invention is the use of a shaft/disk locking assembly in the connection between the power shaft and the pair of cam disks. FIG. 5 is another view of linear motion mixer 10, particularly showing a shaft/disk locking assembly 50 disposed at the connection between each cam disk 22 and power shaft 20 (shown as locking assemblies 50-1 and 50-2, respectively). Anti-friction bearing assemblies 52 are included along power shaft 20 to maintain a low-friction rotation of cam disks 22. Also shown in a cut-away portion of FIG. 5 is an exemplary connection between the pair of cam followers 28-1, 28-2 and linear motion shaft 16. As mentioned above, a cam hub 30 is used to provide this attachment. FIG. 5 illustrates in particular the attachment of cam followers 28 and linear motion shaft 16 to hub 30.

An anti-rotation bracket 54 is shown in the illustration of FIG. 5 and while not required for some configurations of the present invention, is considered useful in minimizing any rocking motion of linear motion shaft 16. In particular, anti-rotation bracket comprises a plate 56 that is attached to an outer casing 13 of power conversion unit 12. A slot 58 is formed along a longitudinal axis of plate 56. An upper portion of linear motion shaft 16 is formed in this case to include a guide pin 60 that engages slot 58. Thus, the movement of guide pin 60 within slot 58 further confines the movement of linear motion shaft 16 to remain a one-dimensional, linear reciprocating motion along the longitudinal axis of the shaft.

Figure 6:
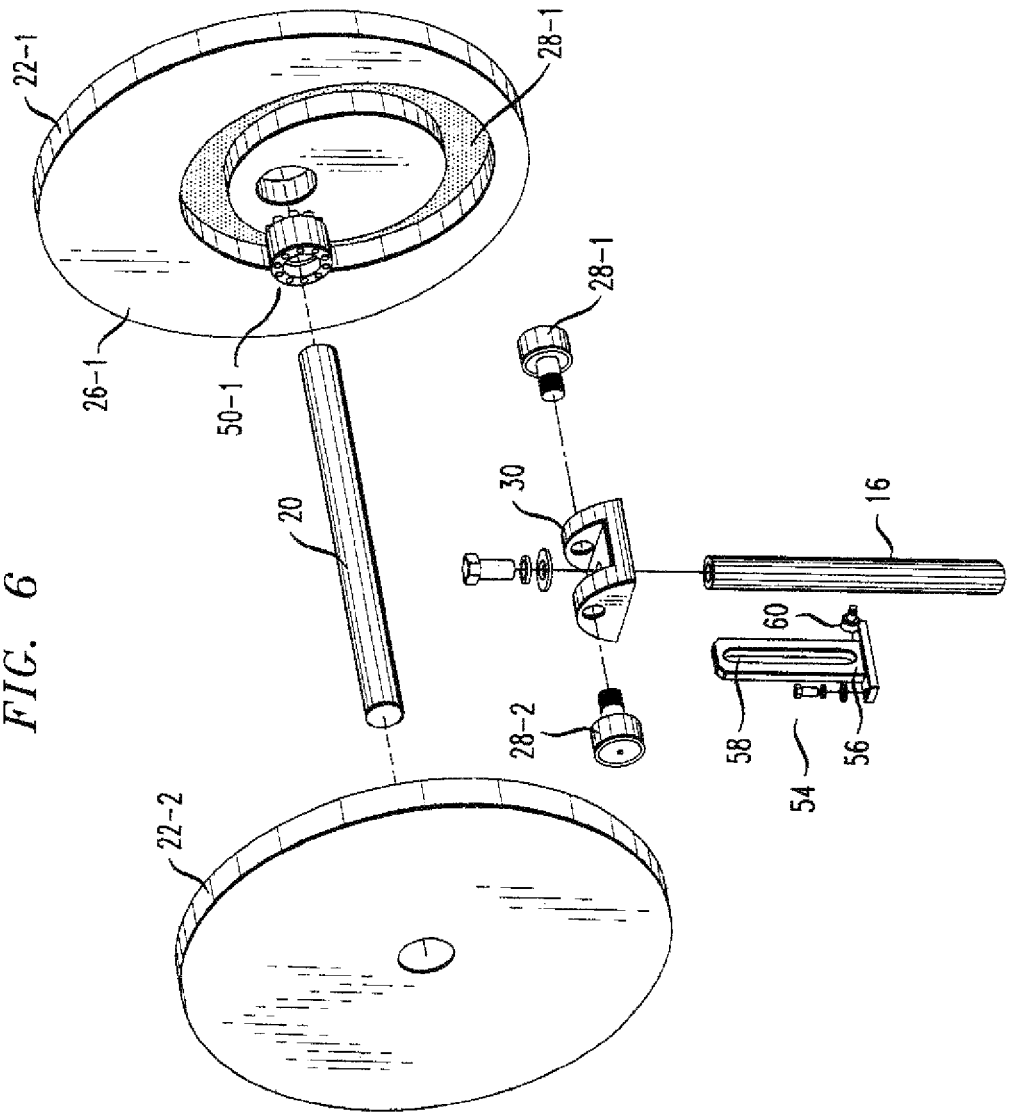
FIG. 6 is an exploded view of the configuration of FIG. 5.

FIG. 6 is an exploded view of conversion unit 12, clearly illustrating the various individual components and showing in particular the arrangement for attaching cam followers 28-1, 28-2 and linear motion shaft 16 to cam hub 30. It is to be understood that while the motion conversion apparatus of the present invention has been described in the context of a mixer apparatus, there are a variety of other applications for such a motion conversion unit, which is able to produce reciprocal linear motion from a rotational input movement.

Various other modifications and alterations may be used in the design and manufacture of the mixing apparatus according to the present invention without departing from the spirit and scope thereof, which is limited only by the accompanying claims.

What is claimed is:

1. Apparatus for converting rotational motion to linear, reciprocal motion, the apparatus comprising
    a pair of spaced-apart cam disks, each disk including an inscribed channel formed within a surface thereof, the pair of spaced-apart cam disks oriented such that the inscribed channels face each other in a matched orientation;
    a drive shaft disposed through and attached to the centers of the pair of spaced-apart cam disks, imparting synchronous rotational movement to the attached pair of spaced-apart cam disks;
    a pair of cam followers, each cam follower disposed within a separate one of the inscribed channels, the pair of cam followers tracing the path of the inscribed channels as the pair of spaced-apart cam disks are rotated together by the attached drive shaft;
    a linear motion shaft coupled to the pair of cam followers, where the motion of the pair of cam followers imparts linear, reciprocal motion to the linear motion shaft along a longitudinal axis of the linear motion shaft; and
    an anti-rotation bracket coupled between an apparatus outer casing and the linear motion shaft to confine the movement of the linear motion shaft along the longitudinal axis, the anti-rotation bracket comprising: a plate attached to the apparatus outer casing; a slot formed along a longitudinal extent of the plate; and a guide pin, the guide pin for attachment to the linear motion shaft and sized to move within the slot and prevent movement of the linear motion shaft away from the longitudinal axis.

2. The apparatus as defined in claim 1, wherein the apparatus further comprises a cam hub disposed between and connected to the pair of cam followers, the linear motion shaft attached to the cam hub.

3. The apparatus as defined in claim 1 wherein the pair of spaced-apart cam disks are attached to the power shaft via a shaft/disk locking assembly.

4. The apparatus as defined in claim 1 wherein the inscribed channels exhibit a circular topology.

5. The apparatus as defined in claim 1 wherein the inscribed channels exhibit an oval topology.

6. The apparatus as defined in claim 1 wherein the inscribed channels are configured as closed-loop paths with a topology designed to provide a desired frequency of reciprocal motion of the linear motion shaft.

7. The apparatus as defined in claim 1 wherein the inscribed channels are configured as closed-loop paths with a topology designed to provide a desired amplitude of longitudinal motion of the linear motion shaft.

8. The apparatus as defined in claim 1 wherein the inscribed channels are configured as closed-loop paths with a topology designed to provide a desired acceleration of movement of the linear motion shaft.

9. The apparatus as defined in claim 1 wherein the apparatus further comprises a power unit coupled to the power shaft for imparting rotational movement to the attached pair of spaced-apart cam disks.

* * * * *